Oct. 1, 1963 W. A. SEUBERT 3,105,269
RADIAL EXTRUSION DIE
Filed Dec. 2, 1960
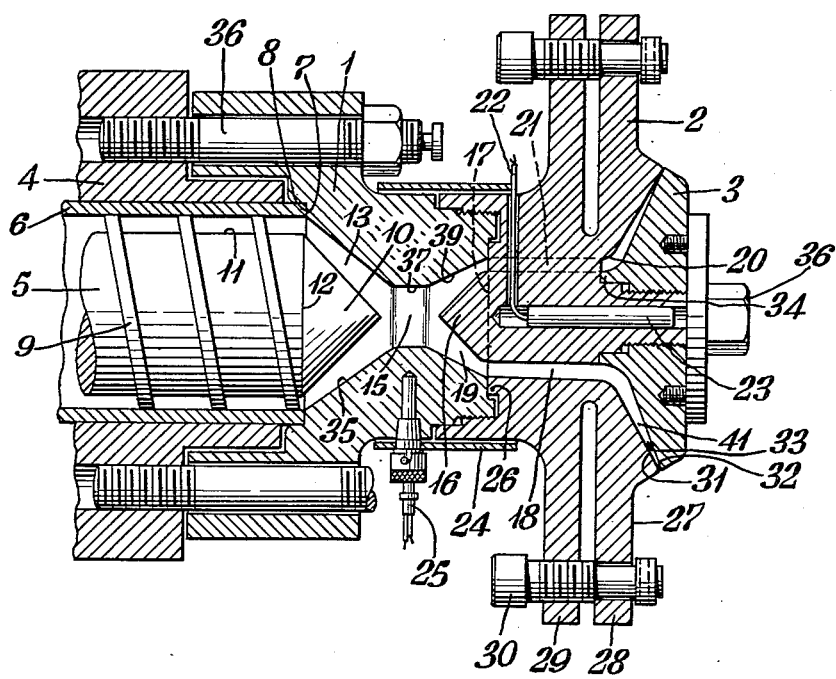
INVENTOR
WILLIAM A. SEUBERT
BY James C. Arrantes
ATTORNEY 3,105,269
RADIAL EXTRUSION DIE
William A. Seubert, Trenton, N.J., assignor to Union
Carbide Corporation, a corporation of New York
Filed Dec. 2, 1960, Ser. No. 73,324
7 Claims. (Cl. 18—14)

This invention relates to a radial extrusion die which is particularly adaptable for use in extruding heat-sensitive thermoplastic polymers. More specifically, this invention relates to a radial extrusion die which is suitable for use in extruding thermoplastic polymers into the form of seamless tubings which can be biaxially stretched to produce thermoplastic film characterized by improved mechanical properties, such as improved tensile strength and tensile modulus.

Extrusion of thermoplastic polymers through a radial extrusion die into the form of seamless tubings, at appropriate temperatures, thereby effecting an orientation of the molecules thereof has been found to be the most simple and the most economical means of producing thin, thermoplastic film of improved mechanical properties. Furthermore, the use of a radial extrusion die allows for the production of thermoplastic film, on the order of 1 mil and less, which cannot be produced by casting or calendering operations.

In general, thermoplastic polymers are extruded through a radial extrusion die while in their "melt state" wherein the polymer being extruded fuses together and forms a seamless tubing which is then extruded. In the "melt state," thermoplastic polymers are at relatively high temperatures and their behavior is that of viscous liquids. By extruding thermoplastic polymers into the form of seamless tubings while the polymers are at relatively high temperatures and in their "melt state," the power requirements for forcing the polymers into and through a radial extrusion die are of such a low order of magnitude, that conventional, low pressure extruders can be employed for that purpose. This is an important consideration from an economical standpoint as recourse to expensive, high pressure extruders adds significantly to the over-all cost of producing thermoplastic film.

Attendant with the relatively high temperatures required for extruding thermoplastic polymers in their "melt state" through currently available radial extrusion dies, however, is the problem of thermal decomposition of the polymers within the dies at areas at which the polymers stagnate. With radial extrusion dies that are currently available, it has not been possible to continuously extrude heat-sensitive thermoplastic polymers, such as polyvinyl chloride, at relatively high temperatures, without having some of the polymer which is being extruded stagnate within the radial extrusion die and thermally decompose therein. On decomposing, the material flakes into and contaminates the freely flowing portion of the polymer resulting in the production of an extruded film which has undesirable "gel" specks, undesirable color characteristics, poor mechanical properties and is, in general, unacceptable for use in commercial applications, as for example, wrapping material for cosmetics and the like.

The present invention provides a radial extrusion die wherein there is practically no stagnation and consequently no decomposition of the thermoplastic polymer which is being extruded. Extruded film formed, therefore, is free of "contamination" as explained. Furthermore, the size of the opening of the orifice of the radial extrusion die of this invention can be easily adjusted to provide for the extrusion of tubular film having the desired thickness. As an additional feature, the radial extrusion die of this invention can be easily assembled and disassembled without the requirement of a large number of man-hours.

Further advantages of the present invention are readily apparent from the following description and from the accompanying drawing wherein there is shown a sectional view in elevation of one embodiment of the radial extrusion die of this invention.

Referring now to the accompanying drawing, the radial extrusion die, which comprises three main functional sections, those being an adapter 1, a die body 2, and a die head 3 which are secured one to another as shown, is concentrically mounted over the cylindrical cavity of extruder 4 and forms a passageway for the thermoplastic polymer, which passes from the extruder into and through the radial extrusion die, up to the entrance of the radial passageway of the radial extrusion die wherein the cross sectional area at any point perpendicular to flow of the thermoplastic polymer therein is substantially equal and substantially equal to the cross sectional area perpendicular to flow of the thermoplastic polymer at any point in the passageway of extruder 4, which as shown in the accompanying drawing, is defined between conveyer worm 5 and cylindrical barrel liner 6.

The radial extrusion die is concentrically mounted over extruder 4 and conveniently secured thereto through adapter 1, one of its main functional sections, by means of bolts 36. The number of bolts 36, around the outer periphery of adapter 1, can vary in number from at least 2 to a number sufficient to insure that adapter 1 is tightly secured to extruder 4. Adapter 1, at its end removed from extruder 4, has a threaded section for securing thereto die body 2 which has a complementary threaded section.

Adapter 1 has a recess under its internal shoulder 7 which provides a seating surface for the outer, flat-surfaced end 8 of cylindrical barrel liner 6, the outer, flat-surfaced end 8 of cylindrical barrel liner 6 fitting into the recess and squarely and evenly abutting the walls of adapter 1 at that point. By providing a single point of abutting contact between adapter 1 and flat-surfaced end 8 of cylindrical barrel liner 6, which is a part of extruder 4, barrel liner 6 will seat against adapter 1 to form a tight fit therebetween with the result that no leakage of material occurs as thermoplastic enters the radial extrusion die from extruder 4.

In the cylindrical cavity of extruder 4, bounded by cylindrical barrel liner 6, there is rotatably mounted conveyer worm 5 which terminates in conical tip 10 and which has screw threads 9. Conveyer worm 5 is driven by any convenient means (not shown) and serves, in part, to convey thermoplastic polymers from an inlet point (not shown) of extruder 4, along the passageway of extruder 4, defined between cylindrical barrel liner 6 and conveyer worm 5, and to force the polymer being extruded into and thorugh the radial extrusion die.

Screw root 11 of conveyer worm 5 can be straight, as shown, or tapered depending upon the distribution pattern required for conveying the particular thermoplastic which is to be extruded. Screw threads 9 can be square, as shown in the accompanying drawing, or if desired, they can be rounded. Generally, screw threads 9 run the entire length of conveyer worm 5 beginning at the inlet point (not shown) of extruder 4 and extending to base 12 of conical tip 10.

On mounting adapter 1 over the cylindrical cavity of extruder 4, conical tip 10 of worm 5 extends into adapter 1 and is spaced from the walls thereof. The internal, bevelled wall 35 of adapter 1, which extends from the point of contact between adapter 1 and cylindrical barrel liner 6 to about the apex of conical tip 10 converges with the result that converging passageway 13 is defined between the exterior wall of conical tip 10 and interior, converging wall 35 of adapter 1.

Following converging passageway 13 and in communication therewith, is cylindrical passageway 15 which is defined between cylindrical wall 37 of adapter 1 which follows converging wall 35. Cylindrical wall 37 of adapter 1 and consequently cylindrical passageway 15 extend to about the apex of conical plug 16 which is rigidly connected to die body 2. Conical plug 16 is coaxially mounted in adapter 1 and die body 2 and is spaced from the walls thereof. A diverging passageway 19, in communication with cylindrical passage 15, is thereby defined between the internal, diverging wall 39 of adapter 1 and the exterior wall of conical plug 16 which extends from the apex of conical plug 16 to its base 17.

The internal walls of adapter 1 which converge, become cylindrical and then diverge, in conjunction with the walls of conical tip 10 and of conical plug 16 define an "hour glass" passageway for thermoplastics which enter into the radial extrusion die and pass therethrough to annular passageway 18.

Annular passageway 18, which is in communication with diverging passageway 19, is formed by coaxially mounting conical plug 16 in die body 2 and spacing conical plug 16 from the walls of die body 2. Conical plug 16 at its end opposite its apex has a threaded section for securing thereto die head 3 which has a complementary threaded section.

The exact size of the radial extrusion die and of the extruder with which it is used is such that the cross sectional area perpendicular to flow at any point in the converging, cylindrical, diverging and annular passageways is substantially equal and also is substantially equal to the cross sectional area perpendicular to flow at any point in the passageway of the extruder.

Conical plug 16 is conveniently attached to die body 2 by three separate, ½-inch wide metal pieces, commonly referred to as spiders, which are usually in the shape of air foils. One such spider is shown in the accompanying drawing and is identified by numeral 21. Spider 21 and its counterparts (not shown) serve not only to fixedly attach conical plug 16 to die body 2 but, as shown with respect to spider 21, serve to house other elements, as for example is shown in the accompanying drawing, wire leads 22 which connect to electrical cartridge heater 23. Cartridge heater 23 which is housed in conical plug 16 heats conical plug 16 and indirectly heats the thermoplastic which comes in contact with conical plug 16. In addition to cartridge heater 23, the radial extrusion die is usually provided with electrical band heater 24 which circumscribes the radial extrusion die, as shown, and aids in maintaining the temperature of the thermoplastic, which is passing therethrough, at the desired value. Additional heaters can also be used, if so desired.

Temperature of the thermoplastic, as it is passing through the radial extrusion die, is conveniently determined by placing an immersion thermocouple (not shown) in the path of the flowing thermoplastic material. Generally, the immersion thermocouple (not shown) is mounted in adapter 1 and extends into cylindrical passageway 15. Temperature of adapter 1 is determined by thermocouple 25. If required, a number of thermocouples can be utilized in order to determine the temperature of the thermoplastic and/or the temperature of the radial extrusion die at various points of the die.

The radial extrusion die can also be provided with a passageway through which air or other gas can be passed and introduced into the interior of the tubular material which is being extruded in order to expand the tubular material to a diameter greater than its extruded diameter. Usually, this passageway will run through die body 2, through one of the spiders, as for example spider 21, and through conical plug 16, emerging at that end of conical plug 16 which is opposite its apex.

Die body 2, as previously stated, is secured to adapter 1 through complementary threaded sections on die body 2 and adapter 1. In securing die body 2 to adapter 1, die body 2 is screw threaded thereon until flat-surfaced flange 26 of die body 2 squarely and evenly abuts against the flat-surfaced, internal recessed wall of adapter 1 which follows diverging wall 39 of adapter 1. The abutting contact between flange 26 of die body 2 and the flat-surfaced, recessed wall of adapter 1, as shown, insures that there is no leakage of thermoplastic as the thermoplastic polymer enters annular passageway 18 from diverging passageway 19.

Die body 2 has an exterior circumscribing bifurcated flange 27 whose members 28 and 29 are substantially parallel and connected at a number of convenient locations of their extremities, as for example, by nut and bolt assemblies 30. The number of nut and bolt assemblies which connect bifurcated members 28 and 29 will vary, depending upon the actual size of the bifurcated flange 27. The exact number will be such that uniform spacing between bifurcated members 28 and 29 can be maintained at all points by loosening or tightening one or more of the nut and bolt assemblies 30.

Members 28 and 29, as stated, can be brought closer together or spaced further apart by either loosening or tightening nut and bolt assemblies 30 with the result that the flared, front wall 31 of die body 2 which forms the rear die lip of the radial extrusion die orifice 32 is brought closer to or spaced further away from the flared, rear wall 33 of die head 3 which forms the front die lip of radial extrusion die orifice 32, thus adjusting the opening of orifice 32 to the desired value.

The actual spacing between bifurcated members 28 and 29 is not critical but is such that members 28 and 29 can be manipulated as explained in order to provide die orifice 32 with the desired size opening.

Die head 3 which is one of the three main functional sections of the radial extrusion die, is threadably connected to conical plug 16 which as previously stated, is fixedly attached to die body 2. Die head 3 is screw threaded onto conical plug 16 until flat-surfaced flange 34 of die head 3 squarely and evenly abuts against the flat, recessed wall of conical plug 16. The depth of flange 34 is such that when flange 34 abuts the flat, recessed wall of conical plug 16, the desired spacing is effected between flared wall 31 of die body 2 and flared wall 33 of die head 3

The abutting contact between flange 34 and the recessed wall of conical plug 16 prevents leakage of thermoplastics as they pass out of annular passageway 18 into entrance 20 of radial passageway 41 which is in communication with annular passageway 18. Radial passageway 41, which at its tip forms orifice 32, is defined between flared, front wall 31 of die body 2 and flared, rear wall 33 of die head 3.

For purposes of facilitating screw-threading die head 3 onto or off conical plug 16, a flat plate 46 having nut 44 welded thereto is connected to die head 3 through pins 48. A wrench can then be applied to nut 44 in order to thread die head 3 onto or off conical plug 16.

In operation, the flat plate 46 is removed and the radial extension die is heated to the desired temperature by means of heaters 23 and 24. Thermoplastic material is then received from extruder 4 and passes through converging passageway 13, cylindrical passageway 15, diverging passageway 19, annular passageway 18, radial passageway 41 into and through die orifice 32 emerging therefrom in the form of a seamless tubing.

What is claimed is:

1. In combination with an extruder having a cylindrical cavity in which there is rotatably mounted a conveyer worm having a conical tip, a radial extrusion die, concentrically mounted over said cylindrical cavity, into which thermoplastic material is received from said extruder and from which said material is extruded, said radial extrusion die having passageways through which said thermoplastic material passes comprising, in sequential communication one with another, a converging passageway, a cylindrical passageway, a diverging passageway, an annular passageway and a radial passageway, said radial passageway forming at its tip the die orifice of said radial extrusion die, the cross sectional area perpendicular to flow of thermoplastic material passing through said radial extrusion die at any point of said passageways to the entrance of said radial passageway being substantially equal and being substantially equal to the cross sectional area perpendicular to flow at any point in the passageway of said extruder defined in said cylindrical cavity thereof.

2. In combination with an extruder having a cylindrical cavity in which is rotatably mounted a conveyer worm having a conical tip, a radial extrusion die concentrically mounted over said extruder comprising an adapter concentrically mounted over said cylindrical cavity, said adapter having internally converging and diverging walls with a cylindrical wall therebetween, a converging passageway defined between said converging wall of said adapter and said conical tip of said conveyer worm, said converging passageway being in direct communication with the cylindrical passageway defined between said cylindrical wall of said adapter, a die body secured to said adapter and having a flared, front wall at its end removed from said adapter, a conical plug, attached to said die body, coaxially mounted in said adapter and said die body and spaced from the internal walls thereof, a diverging passageway, in direct communication with said cylindrical pasageway of said radial extrusion die, defined between said diverging wall of said adapter and said conical plug, and an annular passageway, in direct communication with said diverging passageway, defined between said die body and said conical plug, a die head, having a flared, rear wall, secured to said conical plug, a radial passageway defined between said flared, rear wall of said die head and said flared, front wall of said die body, said radial passageway being in communication with said annular passageway of said radial extrusion die and forming at its tip the die orifice of said radial extrusion die, the cross sectional area perpendicular to flow at any point in said converging, cylindrical, diverging, and annular passageways to the entrance of said radial passageway being substantially equal and being substantially equal to the cross sectional area perpendicular to flow at any point in the passageway of said extruder defined in said cylindrical cavity thereof.

3. In combination with an extruder having a cylindrical cavity in which is rotatably mounted a conveyer worm having a conical tip, a radial extrusion die concentrically mounted over said extruder for receiving thermoplastic material therefrom, comprising an adapter concentrically mounted over said cylindrical cavity, said adapter having internally converging and diverging walls with a cylindrical wall therebetween, a converging passageway defined between said converging wall of said adapter and said conical tip of said conveyer worm, said converging passageway being in direct communication with the cylindrical passageway defined between said cylindrical wall of said adapter, a die body, secured to said adapter, having a flared, front wall at its end removed from said adapter, a conical plug attached to said die body, coaxially mounted in said adapter and said die body and spaced from the walls thereof, a diverging passageway, in direct communication with said cylindrical passageway of said radial extrusion die, defined between said diverging wall of said adapter and said conical plug, and an annular passageway, in direct communication with said diverging passageway, defined between said die body and said conical plug, the cross sectional area perpendicular to flow of thermoplastic material passing therethrough at any point of said converging, cylindrical, diverging and annular passageways being substantially equal and being substantially equal to the cross sectional area perpendicular to flow at any point in the passageway of said extruder defined in the cylindrical cavity thereof.

4. In combination with an extruder having a cylindrical cavity in which is rotatably mounted a conveyer worm having a conical tip, a radial extrusion die concentrically mounted over said extruder, comprising an adapter concentrically mounted over said cylindrical cavity and having a threaded section at its end which is removed from said cylindrical cavity, said adapter having internally converging and diverging walls with a cylindrical wall therebetween, a converging passageway defined between said converging wall of said adapter and said conical tip of said conveyer worm, said converging passageway being in direct communication with the cylindrical passageway defined between said cylindrical wall of said adapter, a die body, threadably secured to said adapter, having an outer, circumscribing, bifurcated flange and having a flared, front wall at its end removed from said adapter, a conical plug, which has a threaded section at its end opposite its apex, fixedly attached to said die body and coaxially mounted in said adapter and said die body and spaced from the walls thereof, a diverging passageway, in direct communication with said cylindrical passageway of said radial extrusion die, defined between said diverging wall of said adapter and said conical plug, and an annular passageway, in direct communication with said diverging passageway, defined between said die body and said conical plug, the cross-sectional area perpendicular to flow at any point of said converging, cylindrical, diverging and annular passageways being substantially equal and being substantially equal to the cross-sectional area perpendicular to flow at any point of the passageway of said extruder defined in the cylindricla cavity thereof, a die head, threadably secured to said conical plug, having a flared, rear wall spaced from said flared, front wall of said die body, a radial passageway defined between said flared, front wall of said die body and said flared, rear wall of said die head, said radial passageway being in communication with said annular passageway of said radial extrusion die, and forming at its tip the die orifice of said radial extrusion die, and means to adjust the spacing between members of the said bifurcated flange thereby adjusting the size of the opening of said die orifice of said radial extrusion die.

5. In combination with an extruder having a cylindrical cavity defined within a cylindrical barrel liner which has an outer flat surfaced end and in which cavity there is rotatably mounted a conveyer worm having a conical tip, a radial extrusion die concentrically mounted over said extruder comprising an adapter having at one end a threaded section and at its end opposite thereto an internal shoulder and recess thereunder, said adapter concentrically mounted over said cylindrical cavity with the outer flat-surfaced end of said cylindrical barrel liner bounding said cylindrical cavity fitting into said recess of said adapter and squarely and evenly abutting the wall thereof, the walls of said adapter from the point of contact with said cylindrical liner being converging, cylindrical and then diverging, a converging passageway defined between said converging wall of said adapter and said conical tip of said conveyor worm, said converging passageway being in direct communication with the cylindrical passageway of said extrusion die defined between said cylindrical wall of said adapter, a die body having at one end a threaded section and an internal flange and at its end opposite thereto a flared, front wall and between said ends an outer circumscribing bifurcated flange, said die body being threadably secured to said adapter with said internal flange of said die body squarely and evenly abutting the wall of said adapter, a conical plug, which has a threaded section at its end opposite its apex, attached to said die body, said conical plug coaxially mounted in said adapter and in said die body and spaced from the walls thereof, a diverging passageway, in direct communication with said cylindrical passageway of said radial extrusion die, defined between said diverging wall of said adapter and said conical plug, an annular passageway, in direct communication with said diverging passageway, defined between said die body and said conical plug, the cross sectional area perpendicular to flow at any point of said converging, cylindrical, diverging and annular pasasgeways being substantially equal and being substantially equal to the cross sectional area perpendicular to flow at any point of the passageway of said extruder defined in the cylindrical cavity thereof, a die head having an internal flange and a flared, rear wall, said die head threadably secured to said conical plug with the internal flange of said die head squarely and evenly in abutting contact with said conical plug thereby providing a spacing between said flared, rear wall of said die head and said flared, front wall of said die body, a radial passageway defined between said flared, rear wall of said die head and said flared, front wall of said die body, said radial passageway being in communication with said annular passageway of said radial extrusion die and forming at its tip the die orifice of said radial extrusion die, and means to adjust the spacing between members of said bifurcated flange of said die body thereby adjusting the size of the opening of the said die orifice of said radial extrusion die.

6. In combination with an extruder having a cylindrical cavity in which there is rotatably mounted a conveyer worm having a conical tip. a radial extrusion die, concentrically mounted over said cylindrical cavity, into which thermoplastic material is received from said extruder and from which said material is extruded, said radial extrusion die having passageways through which said thermoplastic material passes comprising, in sequential communication one with another, a converging passageway, a cylindrical passageway, a diverging passageway, an annular passageway and a radial passageway, said radial passageway forming at its tip the die orifice of said radial extrusion die and means to adjust the opening of said radial passageway; the cross sectional area perpendicular to flow of thermoplastic material passing through said radial extrusion die at any point of said passageways to the entrance of said radial passageway being substantially equal and being substantially equal to the cross sectional area perpendicular to flow at any point in the passageway of said extruder defined in said cylindrical cavity thereof.

7. In combination with an extruder having a cylindrical cavity in which is rotatably mounted a conveyer worm having a conical tip, a radial extrusion die concentrically mounted over said extruder comprising an adapter concentrically mounted over said cylindrical cavity, said adapter having internally converging and diverging walls with a cylindrical wall therebetween, a converging passageway defined between said converging wall of said adapter and said conical tip of said conveyer worm, said converging passageway being in direct communication with the cylindrical passageway defined between said cylindrical wall of said adapter, a die body secured to said adapter and having a flared, front wall at its end removed from said adapter, a conical plug, attached to said die body, coaxially mounted in said adapter and said die body and spaced from the internal walls thereof, a diverging passageway, in direct communication with said cylindrical passageway of said radial extrusion die, defined between said diverging wall of said adapter and said conical plug, and an annular passageway, in direct communication with said diverging passageway, defined between said die body and said conical plug, a die head, having a flared, rear wall, secured to said conical plug, a radial passageway defined between said flared, rear wall of said die head and said flared, front wall of said die body, said radial, passageway being in communication with said annular passageway of said radial extrusion die and forming at its tip the die orifice of said radial extrusion die, and means to adjust the opening of said radial, passageway; the cross sectional area perpendicular to flow at any point in said, cylindrical, diverging, and annular passageways to the entrance of said radial passageway being substantially equal and being substantially equal to the cross sectional area perpendicular to flow at any point in the passageway of said extruder defined in said cylindrical cavity thereof.

References Cited in the file of this patent

UNITED STATES PATENTS

| | | |
|---|---|---|
| 2,514,841 | Chase | July 11, 1950 |
| 2,632,206 | Pierce | Mar. 24, 1953 |
| 3,020,588 | Ferguson et al. | Feb. 13, 1962 |

FOREIGN PATENTS

| | | |
|---|---|---|
| 961,211 | Germany | Apr. 4, 1957 |